United States Patent
Le

(10) Patent No.: US 12,105,579 B2
(45) Date of Patent: Oct. 1, 2024

(54) SYSTEM AND METHOD FOR AUTOMATED PREDICTION AND DETECTION OF COMPONENT AND SYSTEM FAILURES

(71) Applicant: Texas Tech University System, Lubbock, TX (US)

(72) Inventor: Dy D. Le, Harleysville, PA (US)

(73) Assignee: Texas Tech University System, Lubbock, TX (US)

( * ) Notice: Subject to any disclaimer, the term of this patent is extended or adjusted under 35 U.S.C. 154(b) by 525 days.

(21) Appl. No.: 16/603,763

(22) PCT Filed: Apr. 13, 2018

(86) PCT No.: PCT/US2018/027677
§ 371 (c)(1),
(2) Date: Oct. 8, 2019

(87) PCT Pub. No.: WO2018/191730
PCT Pub. Date: Oct. 18, 2018

(65) Prior Publication Data
US 2020/0110395 A1    Apr. 9, 2020

Related U.S. Application Data

(60) Provisional application No. 62/485,376, filed on Apr. 13, 2017.

(51) Int. Cl.
*G06F 11/07* (2006.01)
*G02B 27/01* (2006.01)
(Continued)

(52) U.S. Cl.
CPC ...... *G06F 11/0781* (2013.01); *G05B 23/0283* (2013.01); *G06F 9/30079* (2013.01);
(Continued)

(58) Field of Classification Search
CPC ....... B60W 60/00276; B60W 60/0017; B60W 60/0011; G08G 1/0133; G08G 1/0145
See application file for complete search history.

(56) References Cited

U.S. PATENT DOCUMENTS 7,979,192 B2   7/2011   Morrison et al.
8,437,904 B2   7/2013   Mansouri et al.
(Continued)

FOREIGN PATENT DOCUMENTS

WO   2011054005 A2   5/2011
WO   2015076493 A1   5/2015

OTHER PUBLICATIONS

International Search Report and Written Opinion for PCT/US2018/027677 dated Jul. 31, 2018.

*Primary Examiner* — James J Lee
*Assistant Examiner* — Wenyuan Yang
(74) *Attorney, Agent, or Firm* — Daniel J. Chalker; Edwin S. Flores; Chalker Flores, LLP

(57) ABSTRACT

A system and method for automatically predicting and detecting a failure of a system or a component includes one or data sources, a data pipeline interface communicably coupled to the one or more data sources, one or more processors communicably coupled to the data pipeline interface and the one or more relational databases, and one or more devices coupled to the one or more processors. The data pipeline interface processes and stores the data in one or more relational databases. The one or more processors quantify, forecast and prognosticate a likelihood of future events using one or more predictive modules, and determine one or more options and impacts using a prescriptive module. The one or more devices provide the one or more options and impacts or implement the one or more options.

13 Claims, 17 Drawing Sheets

(51) Int. Cl.
*G05B 23/02* (2006.01)
*G06F 9/30* (2018.01)
*G06F 16/28* (2019.01)
*G06F 18/25* (2023.01)
*G06N 3/08* (2023.01)
*G07C 5/00* (2006.01)
*G07C 5/08* (2006.01)

(52) U.S. Cl.
CPC ............ *G06F 16/284* (2019.01); *G06F 18/25* (2023.01); *G06N 3/08* (2013.01); *G07C 5/006* (2013.01); *G07C 5/0816* (2013.01); *G02B 27/01* (2013.01)

(56) References Cited

U.S. PATENT DOCUMENTS

| | | | |
|---|---|---|---|
| 9,239,578 B2 | 1/2016 | Ziarno | |
| 10,417,614 B2* | 9/2019 | Johnson | G05B 13/041 |
| 2004/0176887 A1 | 9/2004 | Kent et al. | |
| 2007/0265713 A1 | 11/2007 | Viellette et al. | |
| 2008/0052054 A1* | 2/2008 | Beverina | G06Q 20/203 |
| | | | 703/6 |
| 2009/0043441 A1* | 2/2009 | Breed | G07C 5/085 |
| | | | 701/31.9 |
| 2011/0299470 A1 | 12/2011 | Muller et al. | |
| 2012/0317058 A1* | 12/2012 | Abhulimen | G06N 20/00 |
| | | | 706/2 |
| 2012/0323531 A1* | 12/2012 | Pascu | F01D 17/02 |
| | | | 702/184 |
| 2014/0047271 A1* | 2/2014 | Gray | G06F 11/008 |
| | | | 714/25 |
| 2016/0350173 A1 | 12/2016 | Ahad | |
| 2017/0060656 A1 | 3/2017 | Bhattacharya et al. | |
| 2018/0163689 A1* | 6/2018 | Bykowski | F02D 41/22 |
| 2018/0284749 A1* | 10/2018 | Cella | G05B 19/4185 |
| 2019/0042353 A1* | 2/2019 | Ahad | G06F 11/3495 |
| 2020/0110401 A1* | 4/2020 | Cella | H04B 17/23 |

* cited by examiner

SYSTEM AND METHOD FOR AUTOMATED PREDICTION AND DETECTION OF COMPONENT AND SYSTEM FAILURES

CROSS-REFERENCE TO RELATED APPLICATIONS

This application claims priority to, and is a National Stage Patent Application of International Application No. PCT/US2018/027677 filed on Apr. 13, 2018, which claims priority to U.S. Provisional Patent Application Ser. No. 62/485,376, filed on Apr. 13, 2017. The contents of both applications are incorporated by reference herein in their entirety.

INCORPORATION-BY-REFERENCE OF MATERIALS FILED ON COMPACT DISC

None.

TECHNICAL FIELD OF THE INVENTION

The present invention relates generally to the field of computer systems and, more particularly, to a system and method for automated prediction and detection of component and system failures.

STATEMENT OF FEDERALLY FUNDED RESEARCH

None.

BACKGROUND OF THE INVENTION

System and component failures of vehicles are primarily detected, if at all, during routine or scheduled visual and maintenance programs performed by humans.

SUMMARY OF THE INVENTION

Various embodiment of the present invention can identify ingredients of platform longevity, detect precursors of platform failure onset, enable intelligence capability for platform and operator communication or interaction, and or enable changes in platform or system behavior to prolong platform life.

In addition, various embodiments of the present invention can: (1) enable an intelligent model of expert models that represents (b) a meaningful real-world of complex entity/system of systems containing materiel and human interdependent and independent properties that are ingredients of system longevity or precursors of the onset of failure, (2) automate the data pipeline in real-time to update the models, and (3) allow artificial intelligence (AI) with (a) pattern recognition; (b) machine learning; and (c) cognitive capabilities for self learning and direct feedback to: (i) identify model of models properties such as ingredients of longevity or precursors of the onset of failure, (ii) enable cognitive ability for cueing; human-machine teaming; interaction; and two-way communication in real-time, and (iii) facilitate system behavior change to sustain longevity or to disrupt the failure cascade.

One embodiment of the present invention provides a system for automatically predicting and detecting a failure of a system or a component that includes one or data sources, a data pipeline interface communicably coupled to the one or more data sources, one or more processors communicably coupled to the data pipeline interface and the one or more relational databases, and one or more devices coupled to the one or more processors. The data pipeline interface processes and stores the data in one or more relational databases. The one or more processors quantify, forecast and prognosticate a likelihood of future events using one or more predictive modules, and determine one or more options and impacts using a prescriptive module. The one or more devices provide the one or more options and impacts or implement the one or more options. In one aspect, the predictive modules comprise one or more of regression analysis, regression models, signal detection and data fusion theory, risk and probability of outcomes, multi-scale modeling, remaining useful life analysis, statistical analysis, pattern recognition, neurocomputing, data mining, knowledge discovery in databases. In another aspect, the prescriptive module comprises one or more of deep learning networks, training algorithms or reduced uncertainty analysis.

Another embodiment of the present invention provides a method for automatically predicting and detecting a failure of a system or a component by providing one or data sources, a data pipeline interface communicably coupled to the one or more data sources, one or more processors communicably coupled to the data pipeline interface and the one or more relational databases, and one or more devices coupled to the one or more processors; processing and storing the data in one or more relational databases using the data pipeline interface; quantifying, forecasting and prognosticating a likelihood of future events using one or more predictive modules executed by the one or more processors; determining one or more options and impacts using a prescriptive module executed by the one or more processors; and providing the one or more options and impacts or implementing the one or more options using one or more devices. In one aspect, the predictive modules comprise one or more of regression analysis, regression models, signal detection and data fusion theory, risk and probability of outcomes, multi-scale modeling, remaining useful life analysis, statistical analysis, pattern recognition, neurocomputing, data mining, knowledge discovery in databases. In another aspect, the prescriptive module comprises one or more of deep learning networks, training algorithms or reduced uncertainty analysis.

Yet another embodiment of the present invention provides an awareness and capability system for a vehicle comprising one or more data sources; one or more data collection devices communicably coupled to the one or more data sources; a data aggregator communicably coupled to the one or more collection devices; one or more processors comprising a rule-based pattern recognition module communicably coupled to the data aggregator, a recurrent neural network communicably coupled to the data aggregator, one or more predictive failure models communicably coupled to the recurrent neural network, a risk assessment module communicably coupled to the predictive failure modules, one or more risk and survivability models communicably coupled to the risk assessment module, a rule-based risk and failure module communicably coupled to the one or more predictive failure models and the one or more risk and survivability models, and wherein the rule-based risk and failure module provides a vehicle state awareness and capability information; and an output device communicably coupled to the one or more processors via the rule-based risk and failure module, wherein the output device provides the vehicle state awareness and capability information. In one aspect, a supervised learning module is communicably coupled between the data aggregator and the recurrent neural network. In another aspect, the rule-based pattern recognition module is communicably coupled to the supervised learning module and the one or more predictive failure models. In another aspect, the one or more processors operate and provide data to the display in real time. In another aspect, a ground-based system mirrors and communicates with the awareness and capability system. In another aspect, the ground-based system is synchronized with the awareness and capability system in real time. In another aspect, one or more databases are communicably coupled to the ground-based system that mirrors and/or the awareness and capability system. In another aspect, one or more mission avionics and/or actuation devices communicably coupled to the one or more processors. In another aspect, the output device comprises a display, a heads-up-display, and/or an audio system. In another aspect, the vehicle state awareness and capability information comprises one or more risk levels and/or one or more capability and survivability metrics. In another aspect, the vehicle comprises an aircraft, a land craft, a watercraft, a spacecraft or a hybrid craft. In another aspect, the vehicle comprises a manned vehicle or an unmanned vehicle.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
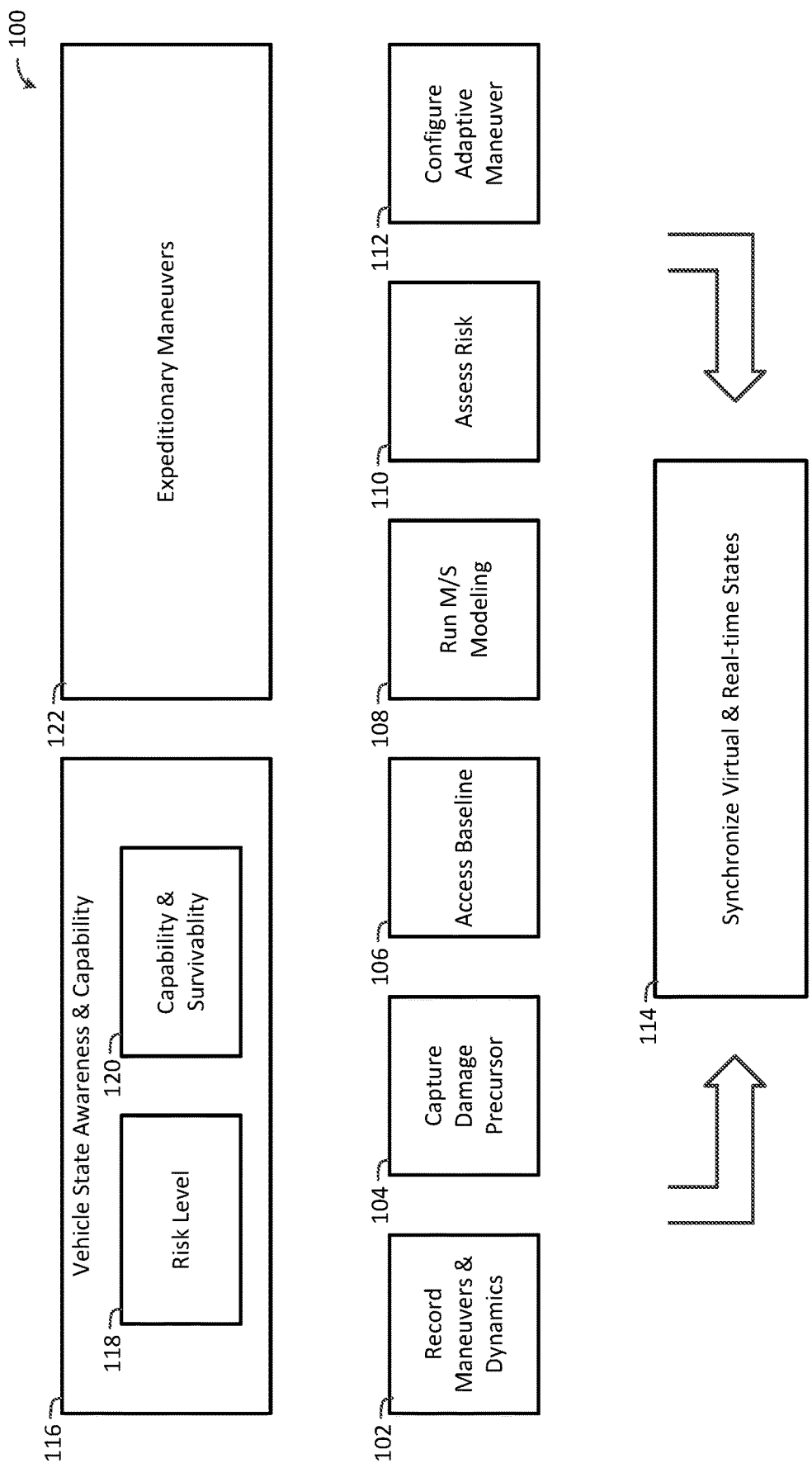
FIG. 1 is a block diagram of a virtual risk-informed agile maneuver sustainment (VRAMS) system in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Note that these terms may be used interchangeable without limiting the scope of the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Various embodiment of the present invention can identify ingredients of platform longevity, detect precursors of platform failure onset, enable intelligence capability for platform and operator communication or interaction, and or enable changes in platform or system behavior to prolong platform life.

In addition, various embodiments of the present invention can: (1) enable an intelligent model of expert models that represents (b) a meaningful real-world of complex entity/system of systems containing materiel and human interdependent and independent properties that are ingredients of system longevity or precursors of the onset of failure, (2) automate the data pipeline in real-time to update the models, and (3) allow artificial intelligence (AI) with (a) pattern recognition; (b) machine learning; and (c) cognitive capabilities for self learning and direct feedback to: (i) identify model of models properties such as ingredients of longevity or precursors of the onset of failure, (ii) enable cognitive ability for cueing; human-machine teaming; interaction; and two-way communication in real-time, and (iii) facilitate system behavior change to sustain longevity or to disrupt the failure cascade. The present invention is referred to as fabrics of artificial intelligence-informed technology for healing (FAITH).

One embodiment of the present invention provides a system and method for automatically predicting and detecting a failure of a system or a component that includes one or data sources, a data pipeline interface communicably coupled to the one or more data sources, one or more processors communicably coupled to the data pipeline interface and the one or more relational databases, and one or more devices coupled to the one or more processors. The data pipeline interface processes and stores the data in one or more relational databases. The one or more processors quantify, forecast and prognosticate a likelihood of future events using one or more predictive modules, and determine one or more options and impacts using a prescriptive module. The one or more devices provide the one or more options and impacts or implement the one or more options.

Now referring to FIG. 1, a block diagram of a virtual risk-informed agile maneuver sustainment (VRAMS) system 100 in accordance with one embodiment of the present invention is shown. The system records maneuvers and dynamics 102, captures damage precursors 104, accesses baselines 106, runs M/S modeling 108, assesses risk 110 and configures adaptive maneuvers 112 while synchronizing virtual and real-time states 114. These blocks can be implemented as system components, modules, elements, etc. The system 100 can visually display vehicle state awareness & capability 116 (e.g., risk levels 118, and capability and survivability metrics 120) (see e.g., FIG. 6) and expeditionary maneuver status 122 (see e.g., FIG. 7), among other things. The vehicle can be manned or unmanned, and can be any type of aircraft, land craft, watercraft, spacecraft, or hybrid craft. Note that the present invention is not limited to vehicles, and can be adapted to weapon platforms or systems, fixed or semi-fixed installations, etc. In block 102, key components, elements, parts and/or systems are monitored either directly or indirectly via sensors, detectors or other monitoring/recording devices. In addition, data is collected and recorded during specific maneuvers or operations. Additional data can be collected and recorded during preparation, recovery and maintenance of the vehicle.

Figure 2:
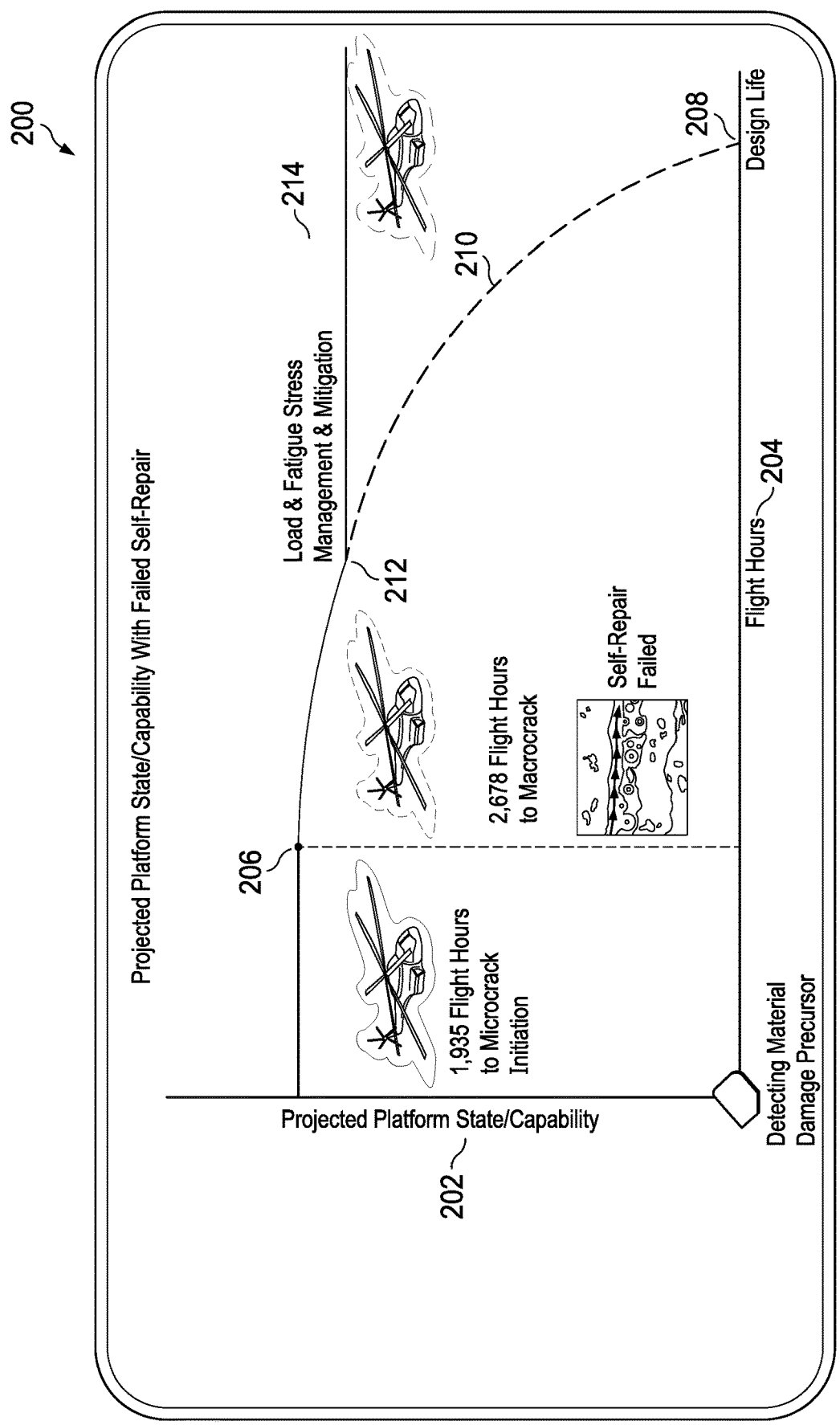
FIG. 2 depicts a graph of a projected platform future state/capability with failed self-repair in accordance with one embodiment of the present invention.

In block 104, damage precursors are captured and the platform state/capability is projected (see e.g, FIG. 2). In block 106, component baseline data (e.g., material properties and characteristics (genome), design criteria and specification, manufacturing techniques, enhancements, etc.) are accessed. In block 108, modeling software is used to analyze the dynamic components and project degradation/failure times for the component (see e.g., FIG. 3). In block 110, the risk associated with a component is assessed (see e.g., FIG. 4). In block 112, adaptive maneuvers are configured for the component and the vehicle (see e.g., FIG. 5).

FIG. 2 depicts a graph of a projected platform future state/capability with failed self-repair 200 as an example of the capture damage precursor 104 (FIG. 1). The graph 200 plots the projected platform state/capability 202 vs. flight hours 204. A microcrack in a component initiates or is detected after 1,935 flight hours (point 206). If self-repair of the component fails, the microcrack is projected to reduce the platform state/capability through the design life 208 of the component as indicated by the curve 210, especially after 2,678 flight hours (point 212). At that point, load and fatigue stress management and mitigation 214 should be performed. A timeline 304 projects the microcrack initiation or is detected after 1,935 flight hours (point 206). If self-repair of the component fails, the microcrack is projected to reduce the platform state/capability through the design life 208 of the component as indicated by the curve 210, especially after 2,678 flight hours (point 212).

Figure 3:
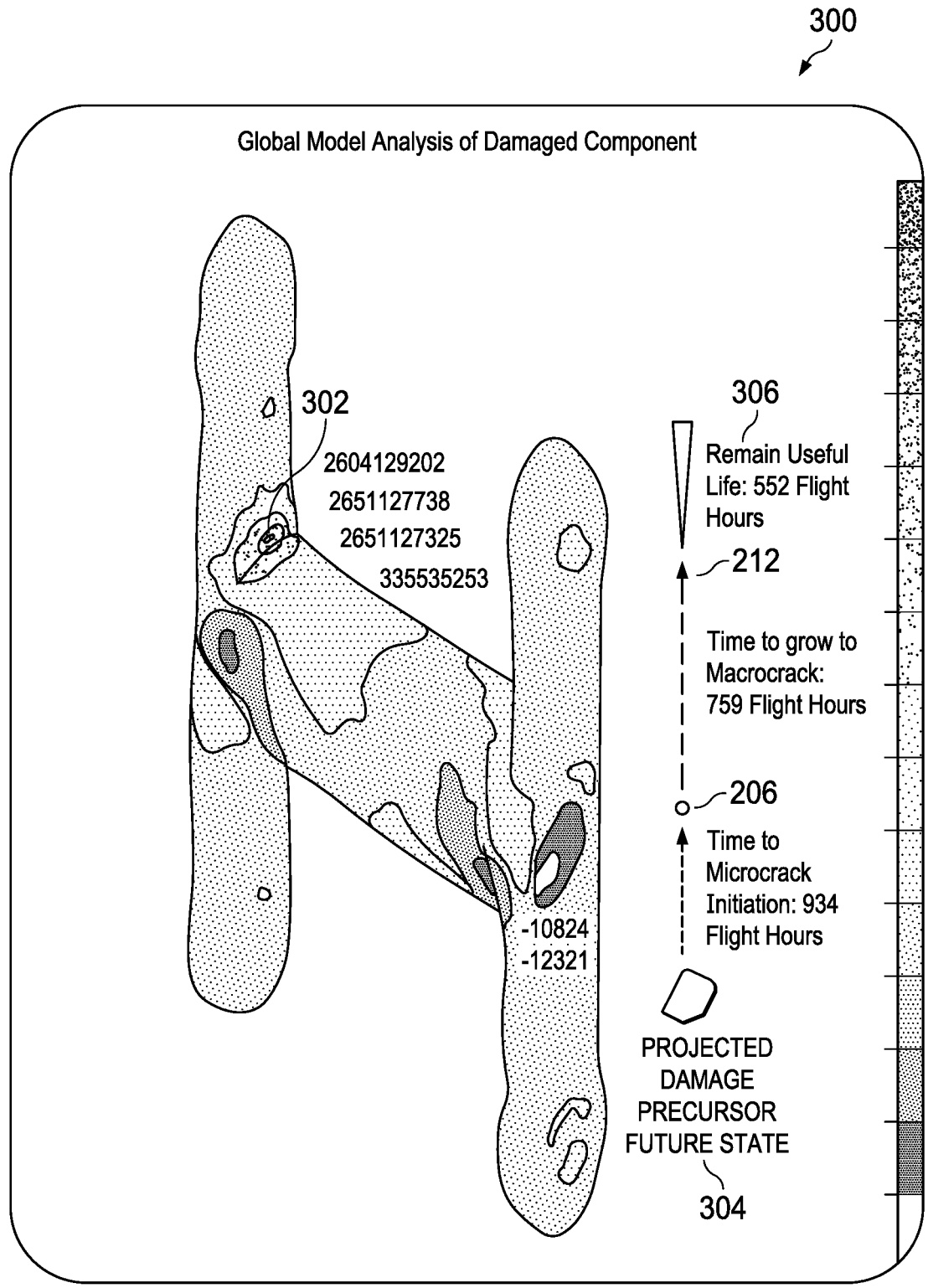
FIG. 3 depicts an image of a global model analysis of a dynamic component in accordance with one embodiment of the present invention.

FIG. 3 depicts an image of a global model analysis of a dynamic component 300. A microcrack 302 is shown and analyzed. A timeline 304 projects the microcrack initiation or is detected after 1,935 flight hours (point 206), reduces the platform state/capability after 2,678 flight hours (point 212), reaches critical length at point 306.

Figure 4:
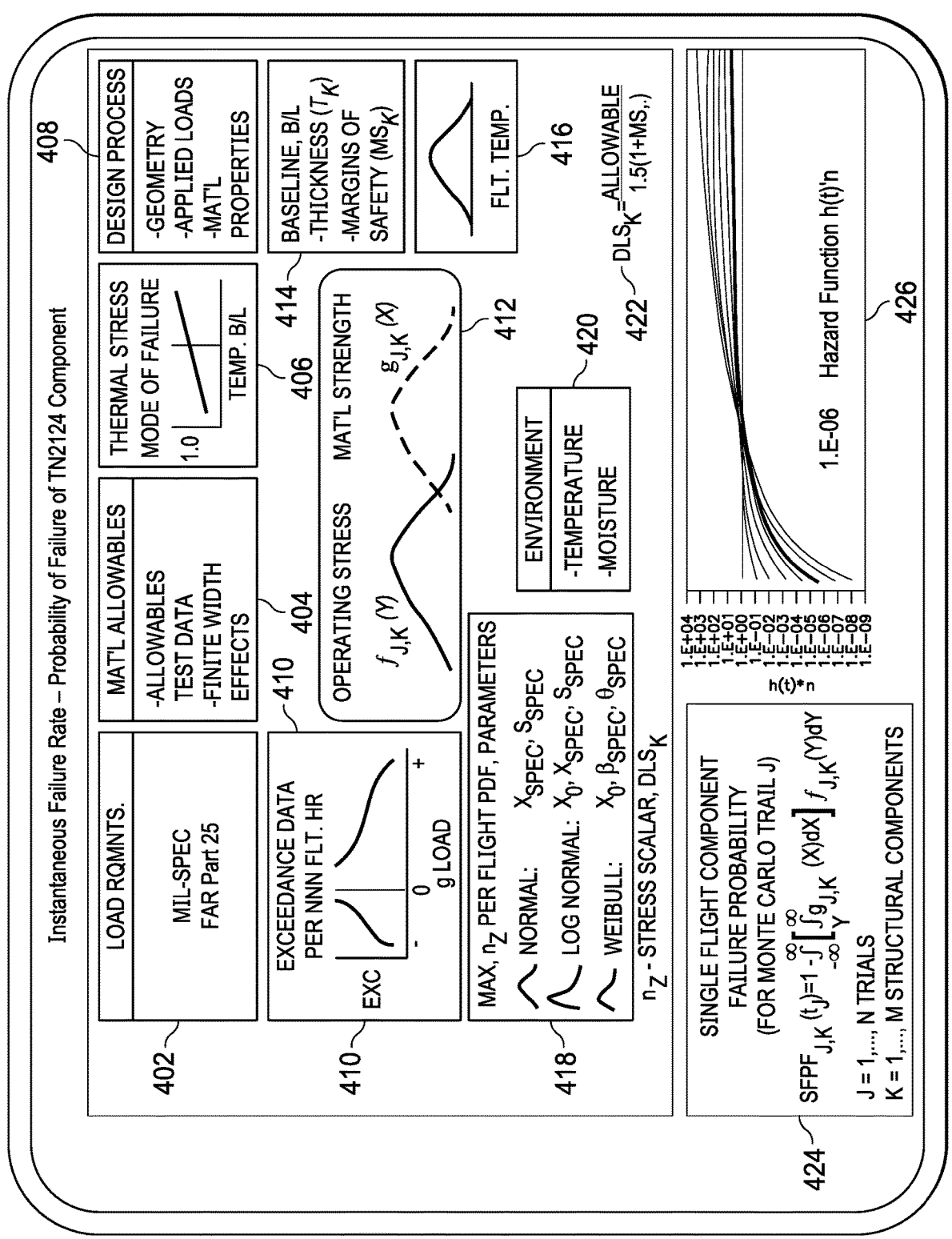
FIG. 4 depicts the instantaneous failure rate—probability of failure of the component assessment using a variety of factors and characteristics in accordance with one embodiment of the present invention.

FIG. 4 depicts the instantaneous failure rate—probability of failure of the component assessment using a variety of factors and characteristics (e.g., load requirements 402, material allowables 404, failure modes 406, design processes 408, exceedance data 410, operating stress-material strength data 412, baseline data 414, temperature data 416, flight parameters 418, environmental parameters 420, single flight component failure probability 422, hazard functions 424, stress scaler 426, etc.).

Figure 5:
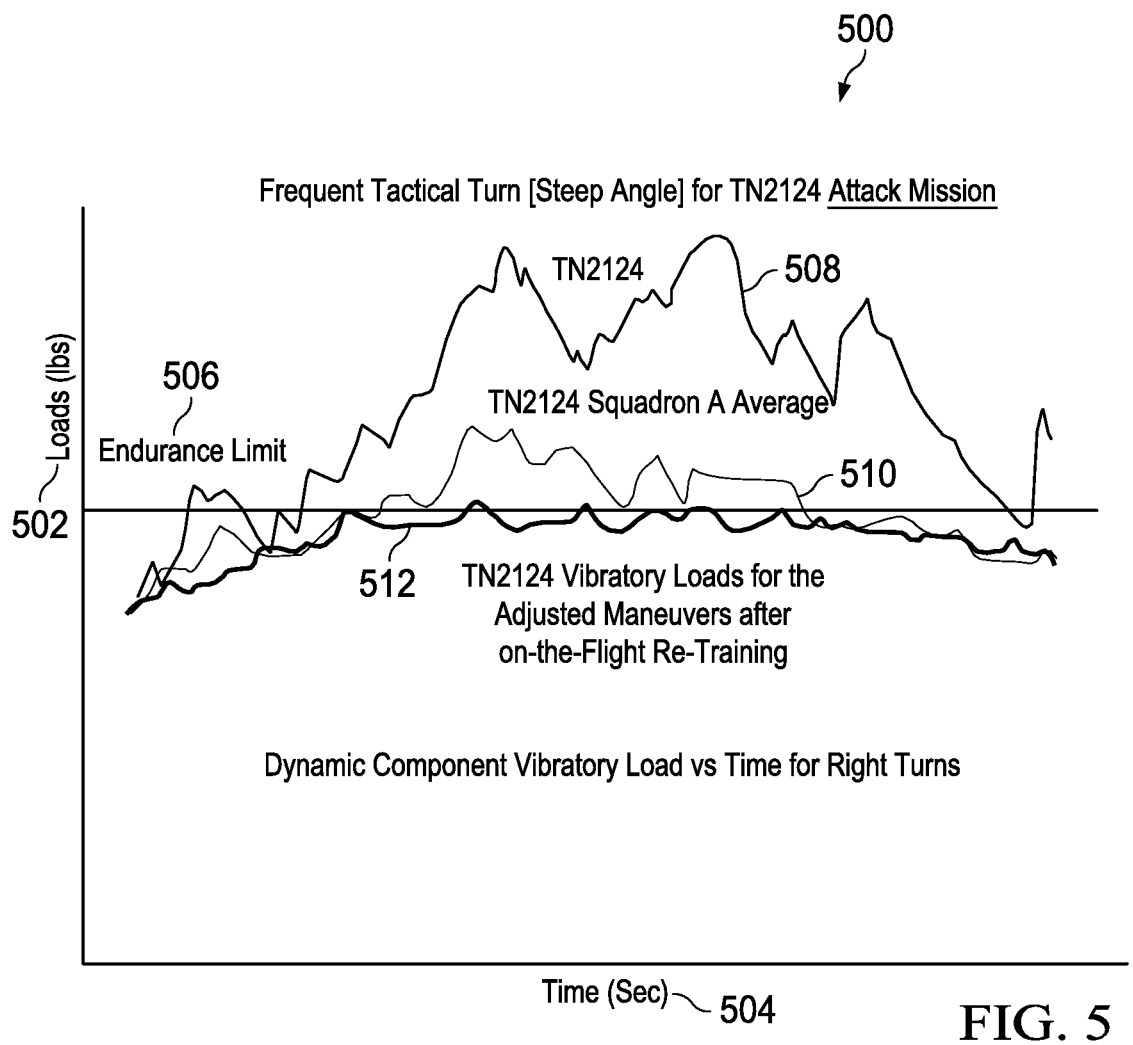
FIG. 5 depicts a graph analyzing frequent tactical turns (steep angle) for the component during an attack mission in accordance with one embodiment of the present invention.

FIG. 5 depicts a graph analyzing frequent tactical turns (steep angle) for the component during an attack mission 500. The graph plots loads (lbs) 502 vs. time (sec) 504 for the component. A horizontal endurance limit line 506 is shown along with data for the specific vehicle 508, and data for the squadron A average 510. The vibratory loads for the adjusted maneuvers after on-the flight retraining 512 is shown below the endurance limit.

Figure 6:
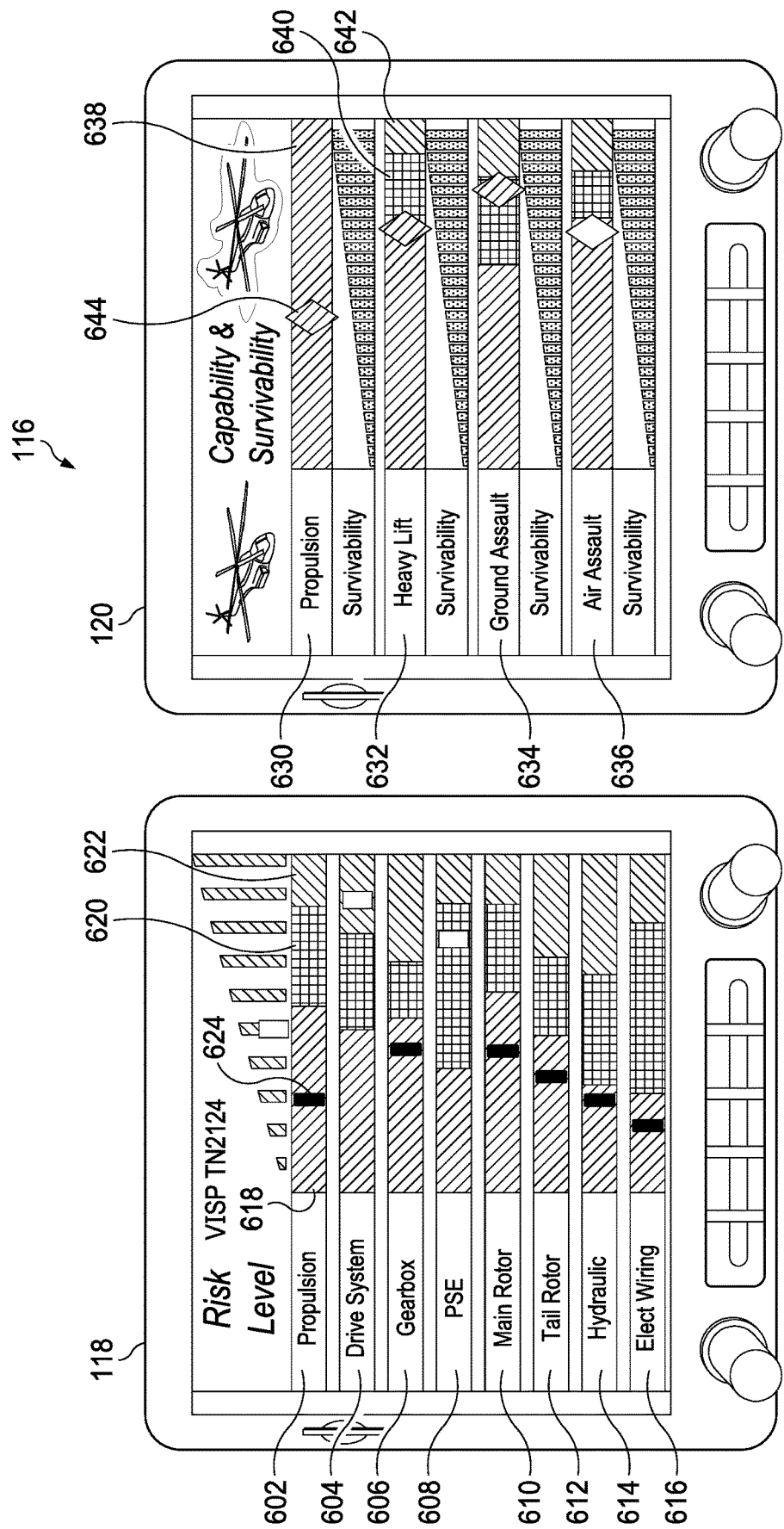
FIG. 6 depicts an example of visually displaying vehicle state awareness & capability in accordance with one embodiment of the present invention.

FIG. 6 depicts an example of visually displaying vehicle state awareness & capability 116 (e.g., risk levels 118, and capability and survivability metrics 120). The risk levels 118 are displayed for various systems of the vehicle, such as propulsion 602, drive system 604, gearbox 606, PSE (principal structural element) 608, main rotor 610, tail rotor 612, hydraulic 614, and electrical wiring 616. The systems displayed will vary based on the type of vehicle. The display 118 can provide green 618, yellow 620 and red 622 indicators with status bars 624 showing current operating parameters. Other colors and types of visual indicators can be used. The capability and survivability metrics 102 displays the survivability for one or more operational capabilities, such as transport 630, heavy lift 632, ground assault 634, and air assault 636. The capability and survivability displayed can vary based on the type of vehicle. The display 120 can provide green 638, yellow 640 and red 642 indicators with status bars 644 showing current operating parameters. Other colors and types of visual indicators can be used. Displays 116 and 118 can be dedicated displays within the vehicle or accessible via other displays in the vehicle. The system may provide audible or visual warnings when any system or survivability metric reaches or crosses one or more specified levels.

Figure 7:
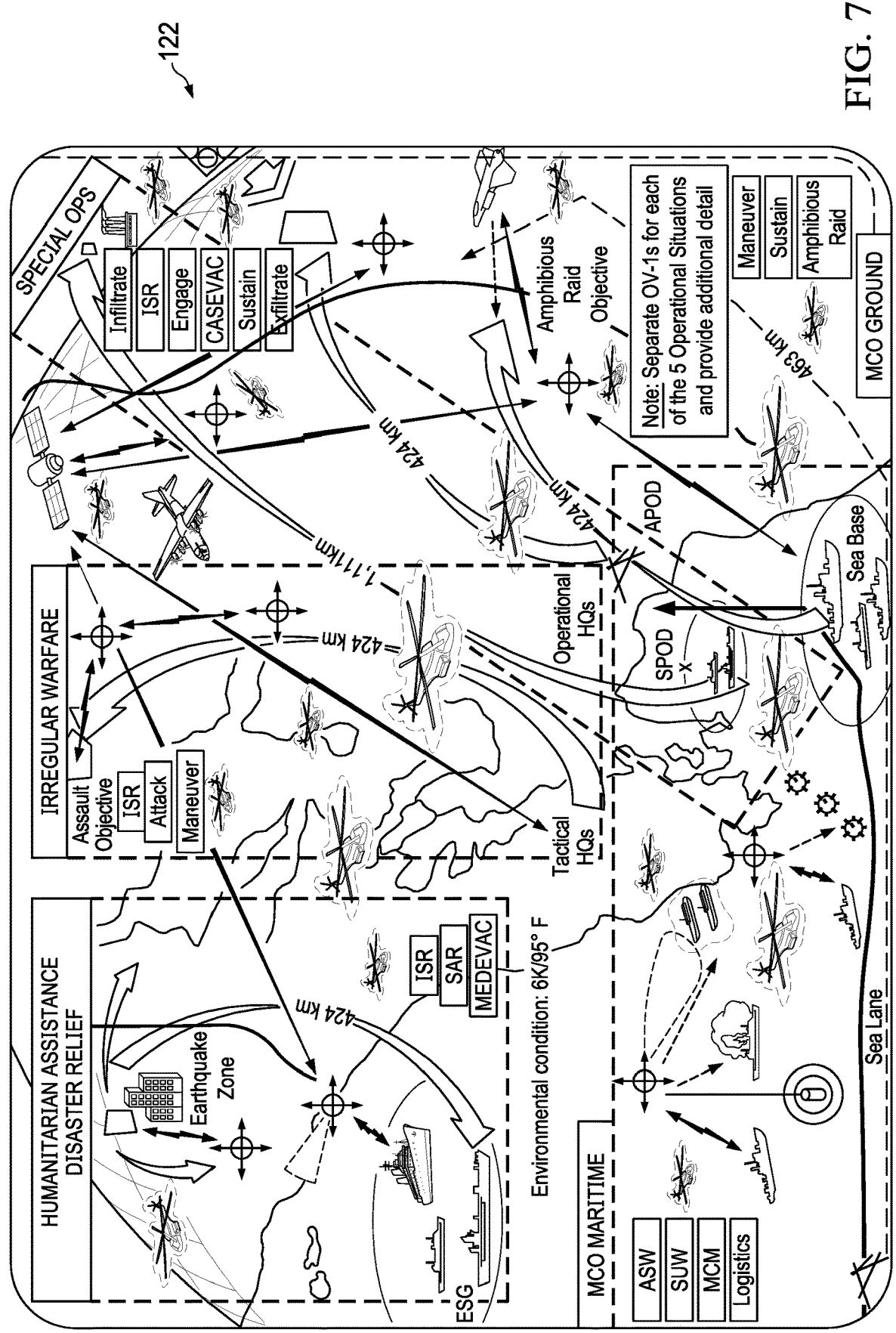
FIG. 7 depicts a virtual (e.g., simulations) or real-time display of expeditionary maneuver status in accordance with one embodiment of the present invention.

FIG. 7 depicts a virtual (e.g., simulations) or real-time display of expeditionary maneuver status 122. The display shows various actions, such as humanitarian assistance disaster relief, irregular warfare, special operations, MCO maritime and MCO ground. Bases, targets, vehicles, geographical features and other data is interactively displayed. The vehicle state awareness & capability 116 of any vehicle display can be accessed and displayed.

Figure 8:
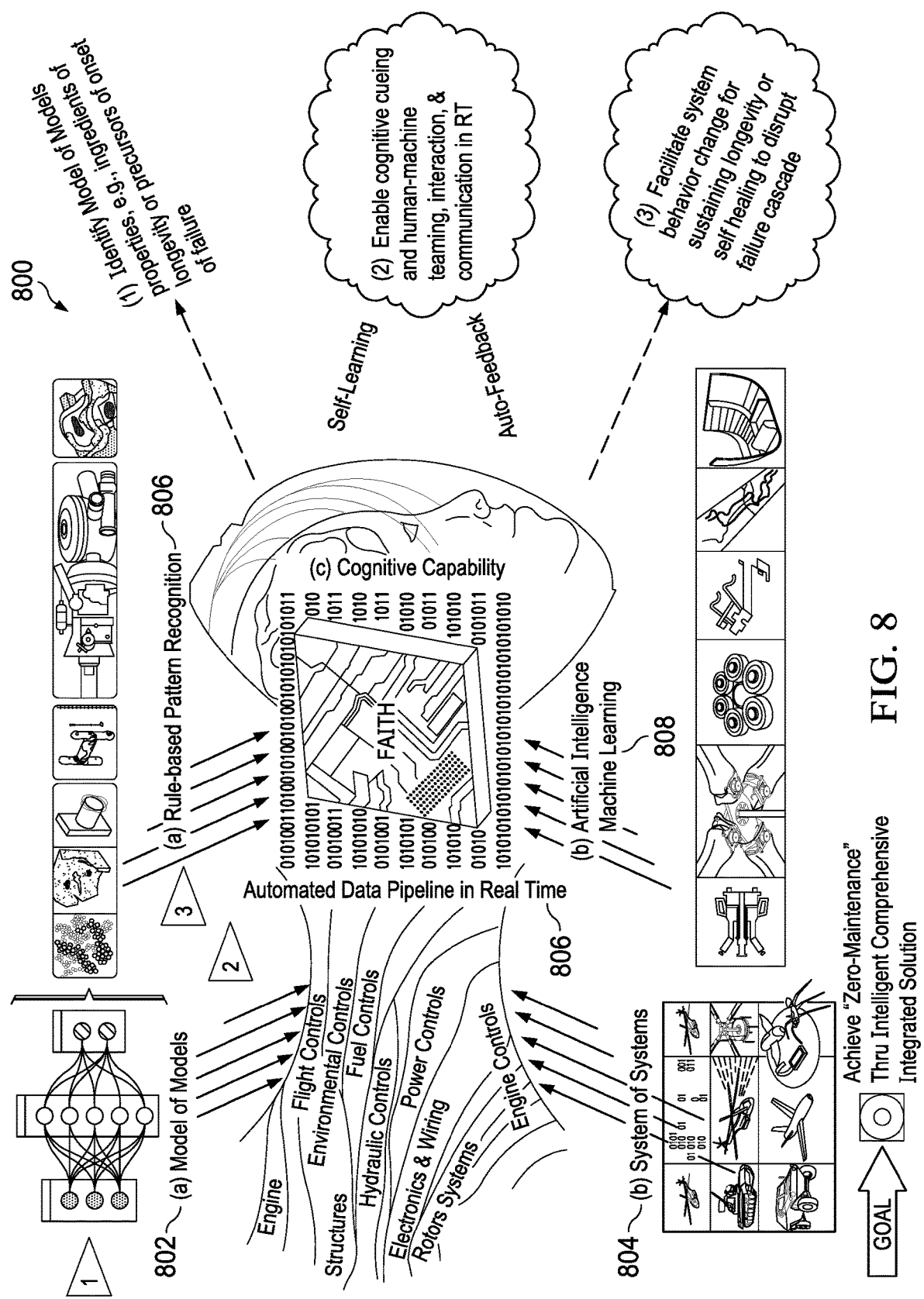
FIG. 8 is a block diagram of a model-based system of systems (MSoS) in accordance with one embodiment of the present invention.

Now referring to FIG. 8, a block diagram of a model-based system of systems (MSoS) 800 in accordance with one embodiment of the present invention is shown. The system uses a model of models 802 and/or system of systems 804 to achieve various goals (steps 1(a) and 1(b)). Automated data 806 (e.g., flight controls, engine, drive, environmental controls, structures, fuel controls, VMS, hydraulic controls, electronics & wiring, power controls, rotors systems, photo, audio, engine controls, text, etc.) (step 2) is provided to a data pipeline in real time (step 3) to the various predictive and prescriptive modules that include rule-based pattern recognition 806 (step 3(a)), artificial intelligence machine learning 808 (step 3(b)) and/or cognitive capability. As a result, the system is self-learning and provides automatic feedback. The model of model properties (e.g., ingredients of longevity or precursors of onset of failure) are identified. The system enables cognitive cueing and human-machine teaming, interaction and communication in real time. In addition, the system facilitates system behavior change for sustaining longevity or self-healing to disrupt failure cascade. The goal is to achieve "zero-maintenance" through an intelligent comprehensive integrated solution.

Figure 9:
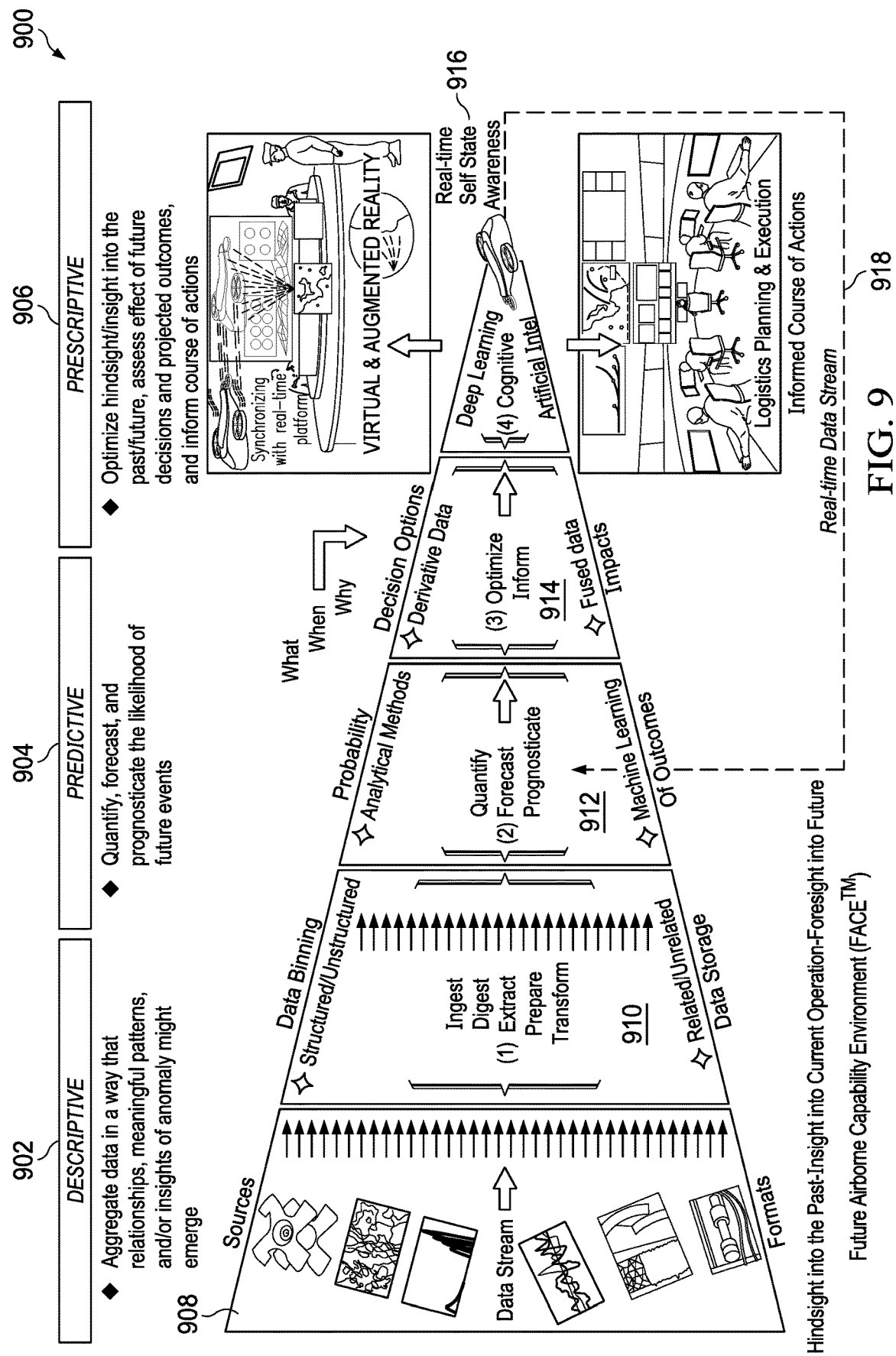
FIG. 9 is a block diagram of core engine algorithm architecture modules in accordance with one embodiment of the present invention.

Now referring to FIG. 9, a block diagram of core engine algorithm architecture modules 900 in accordance with one embodiment of the present invention is shown, otherwise referred to as Future Airborne Capability Environment (FACE). The core engine algorithm architecture modules are descriptive 902, predictive 904 and prescriptive 906. They are descriptive 902 because they aggregate data in a way that relationships, meaningful patterns, and/or insights of anomaly might emerge. They are predictive 904 because they quantify, forecast, and prognosticate the likelihood of future events. They are prescriptive 906 because they optimize hindsight/insight into the past/future, assess effect of future decisions and projected outcomes, and inform course of actions. Data streams from different sources and formats 908 is binned and stored (ingest, digest, extract, prepare and transform) 910. The resulting data analyzed using analytical methods and machine learning to provide probabilities (quantify, forecast and prognosticate) 912. Decision options and impacts are then determined (optimize and inform) 914. Deep learning and artificial intelligence is applied (cognitive) to provide real-time self-state awareness that can be used in virtual and augmented reality, and/or logistic planning and execution 916. This real-time self-state awareness is used as feedback 918 to improve the probabilities provided by the analytical methods and machine learning. As a result, hindsight into the past provides insight into the current operation which provides foresight into the future to provide informed courses of action.

Figure 10:
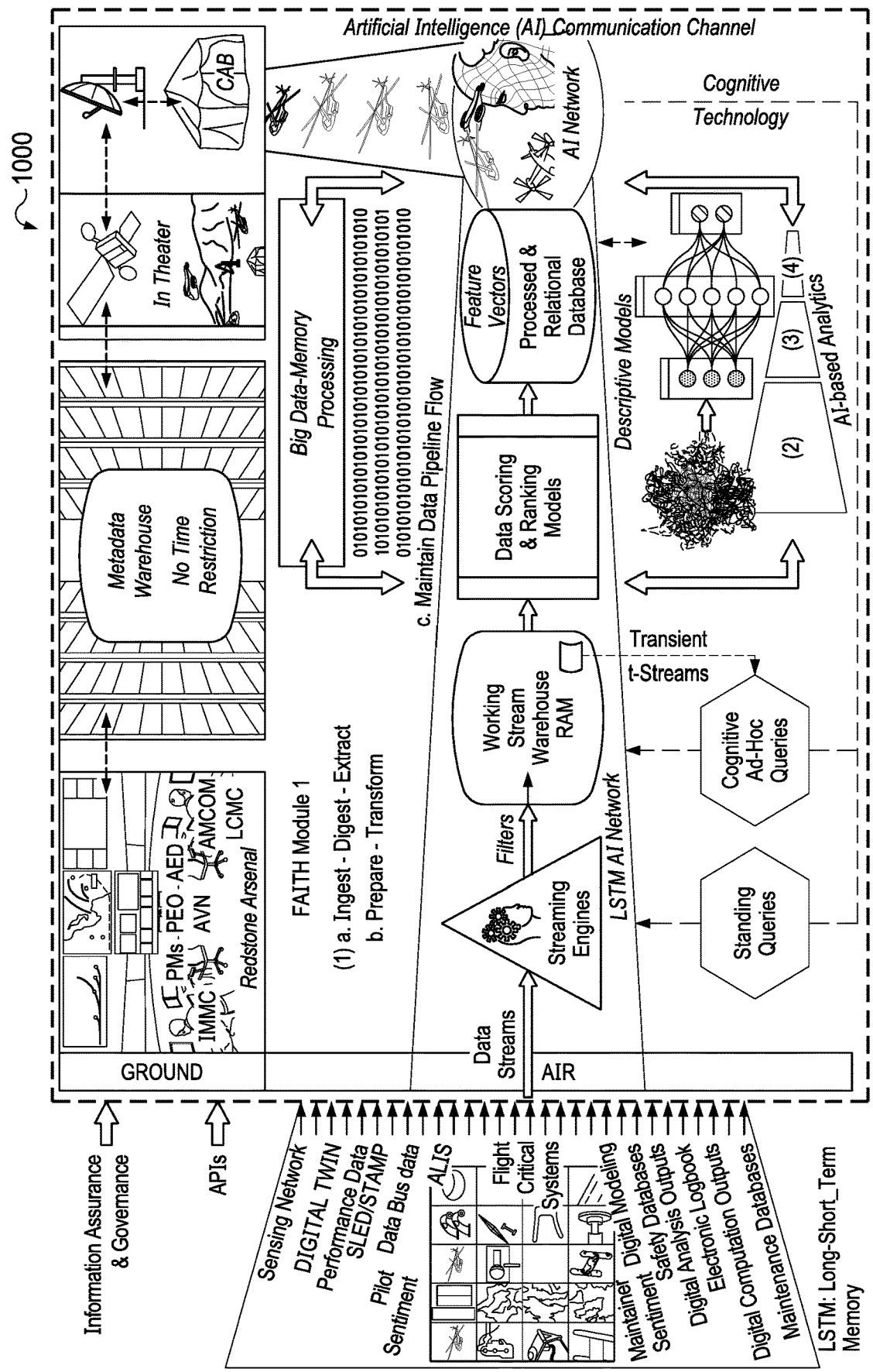
FIG. 10 is a block diagram of an automated data pipeline in accordance with one embodiment of the present invention.

Now referring to FIG. 10, a block diagram of an automated data pipeline module 1000 in accordance with one embodiment of the present invention is shown. The data pipeline module (a) ingests, digests and extracts the data from various data streams, (b) prepares and transforms the data, and (c) maintains the data pipeline flow. The data streams may include sensing network, digital twin, performance data, SLED/STAMP, data bus data, pilot sentiment, ALIS, flight critical systems, maintainer sentiment, digital modeling, safety databases, digital analysis outputs, electronic logbook, digital computation outputs, maintenance databases, etc. The data pipeline module accesses the data sources using streaming engines. The data can be requested using standing queries, cognitive ad-hoc queries, or other methods. The incoming data is filtered and stored. The stored data is scored and ranked using various models. The resulting data is processed and stored in relational databases for use by the other system modules and other authorized users/systems.

Figure 11:
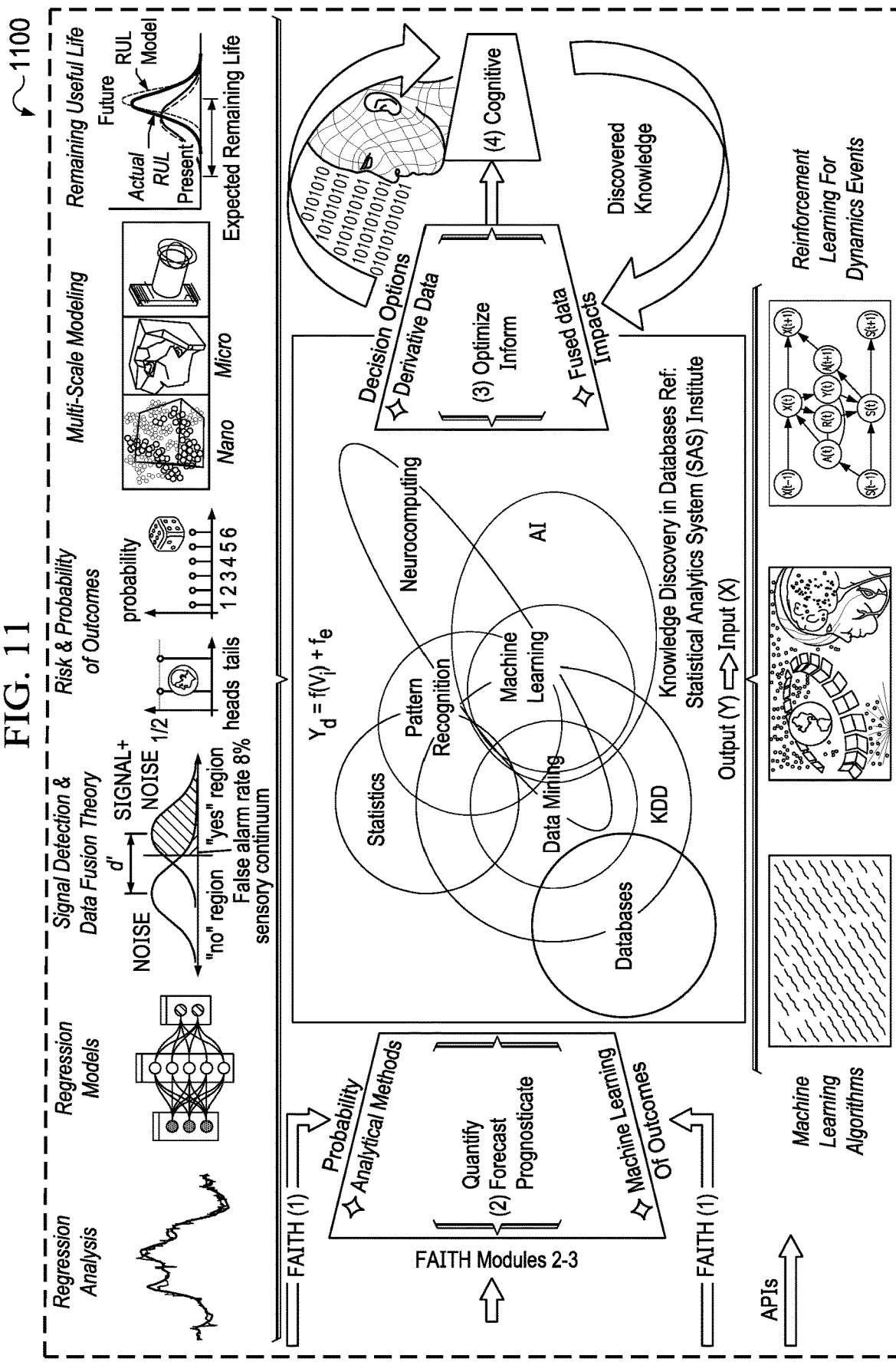
FIG. 11 is a block diagram of predictive modules in accordance with one embodiment of the present invention.

Now referring to FIG. 11, a block diagram of predictive modules 1100 in accordance with one embodiment of the present invention is shown. The predictive modules quantify, forecast, and prognosticate the likelihood of future events using analytical methods and machine learning. This may include regression analysis, regression models, signal detection and data fusion theory, risk and probability of outcomes, multi-scale modeling, remaining useful life analysis, statistical analysis, pattern recognition, neurocomputing, data mining, knowledge discovery in databases, etc. Decision options and impacts are then determined (optimize and inform).

Figure 12:
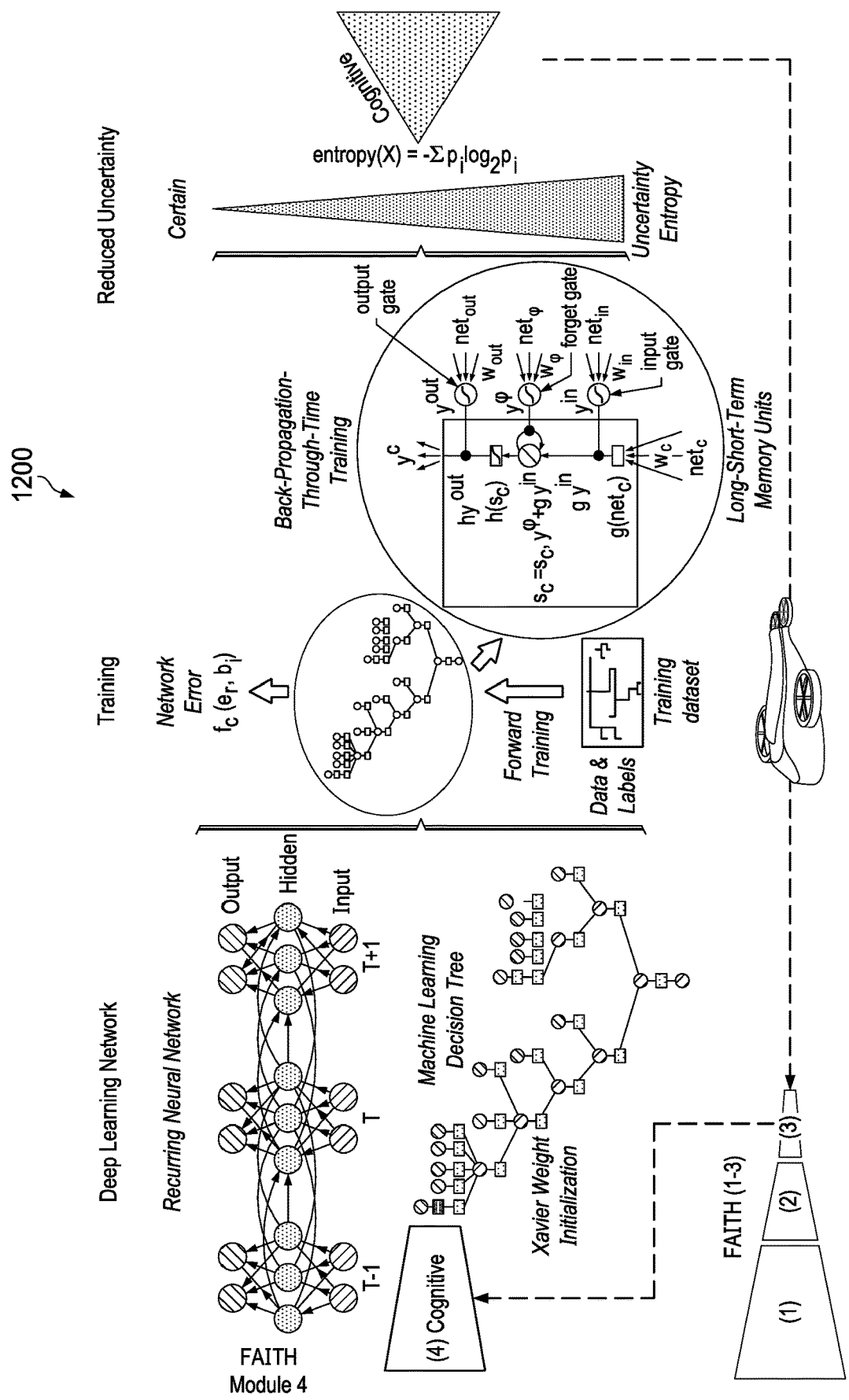
FIG. 12 is a block diagram of a prescriptive module in accordance with one embodiment of the present invention.

Now referring to FIG. 12, a block diagram of a prescriptive module 1200 in accordance with one embodiment of the present invention is shown. The prescriptive or cognitive module uses deep learning networks (e.g., recurring neural networks, Xavier weight initialization, machine learning decision tree, etc.), training (network error analysis, forward training, back-propagation-through-time training, etc.) and reduced uncertainty analysis.

Figure 13:
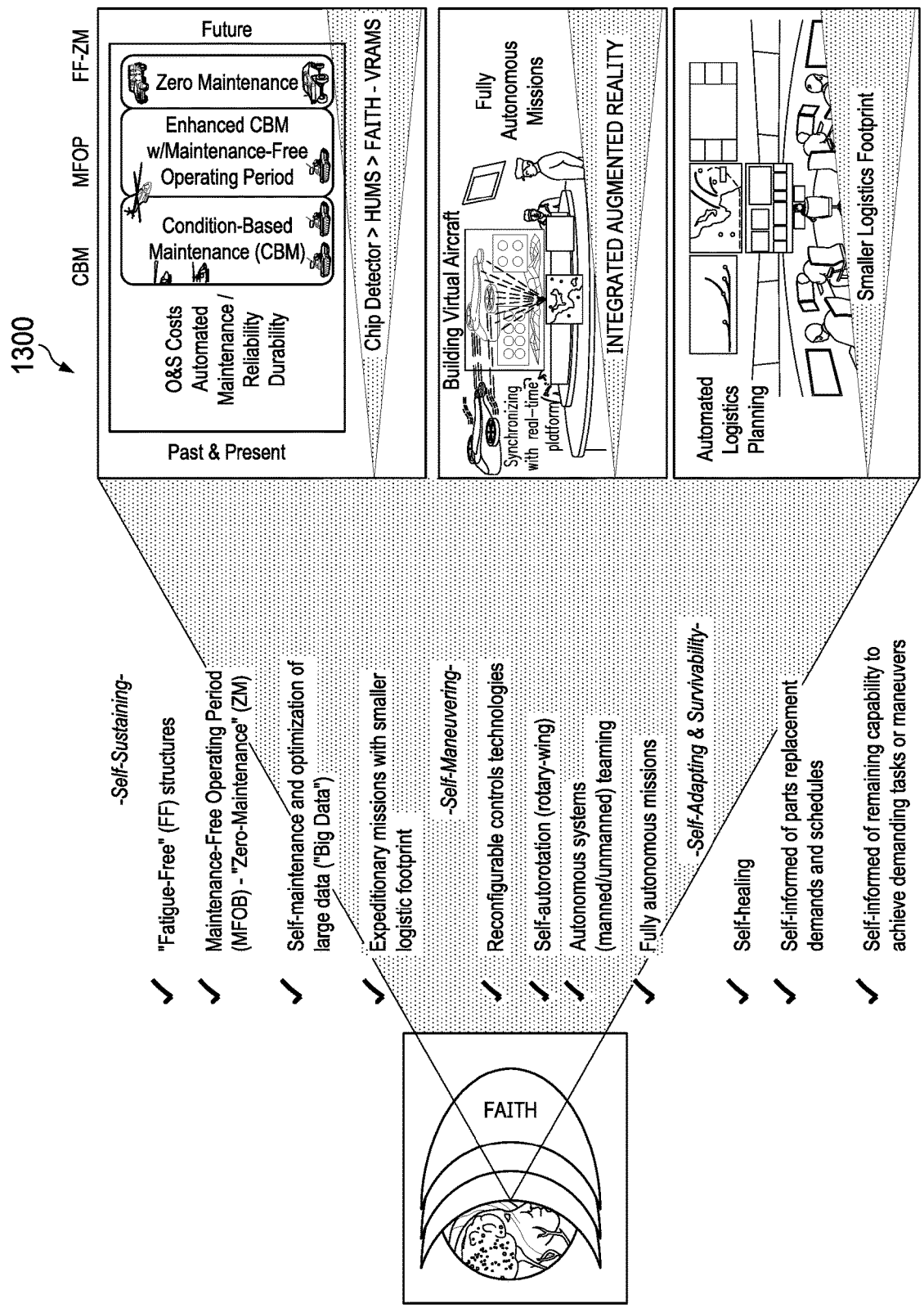
FIG. 13 is a block diagram of a some uses of various embodiments of the present invention.
Figure 14A:
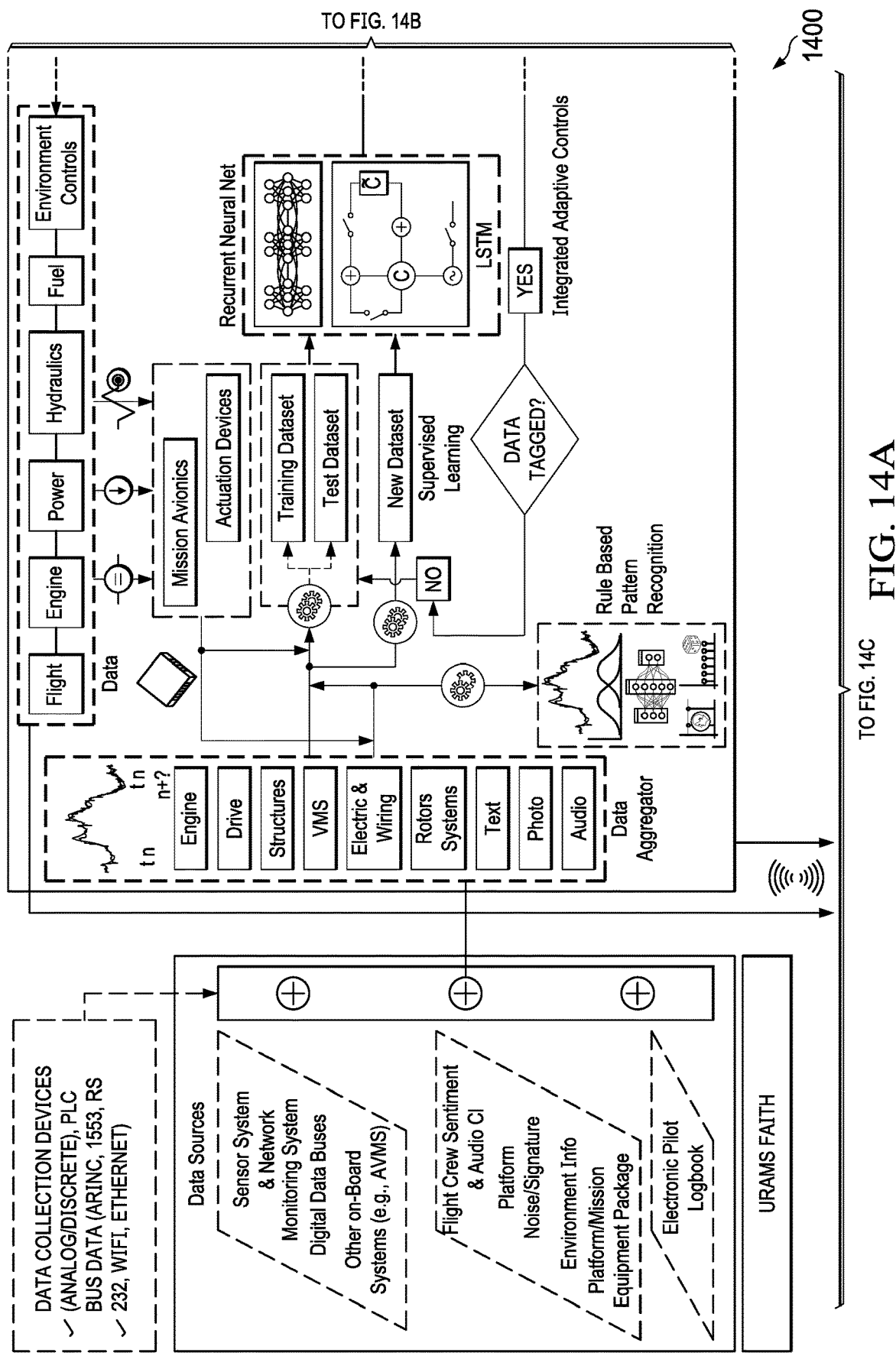
FIGS. 14A-D are a block diagram of a system for automatically predicting and detecting a failure of a system or a component in accordance with one embodiment of the present invention.
Figure 14B:
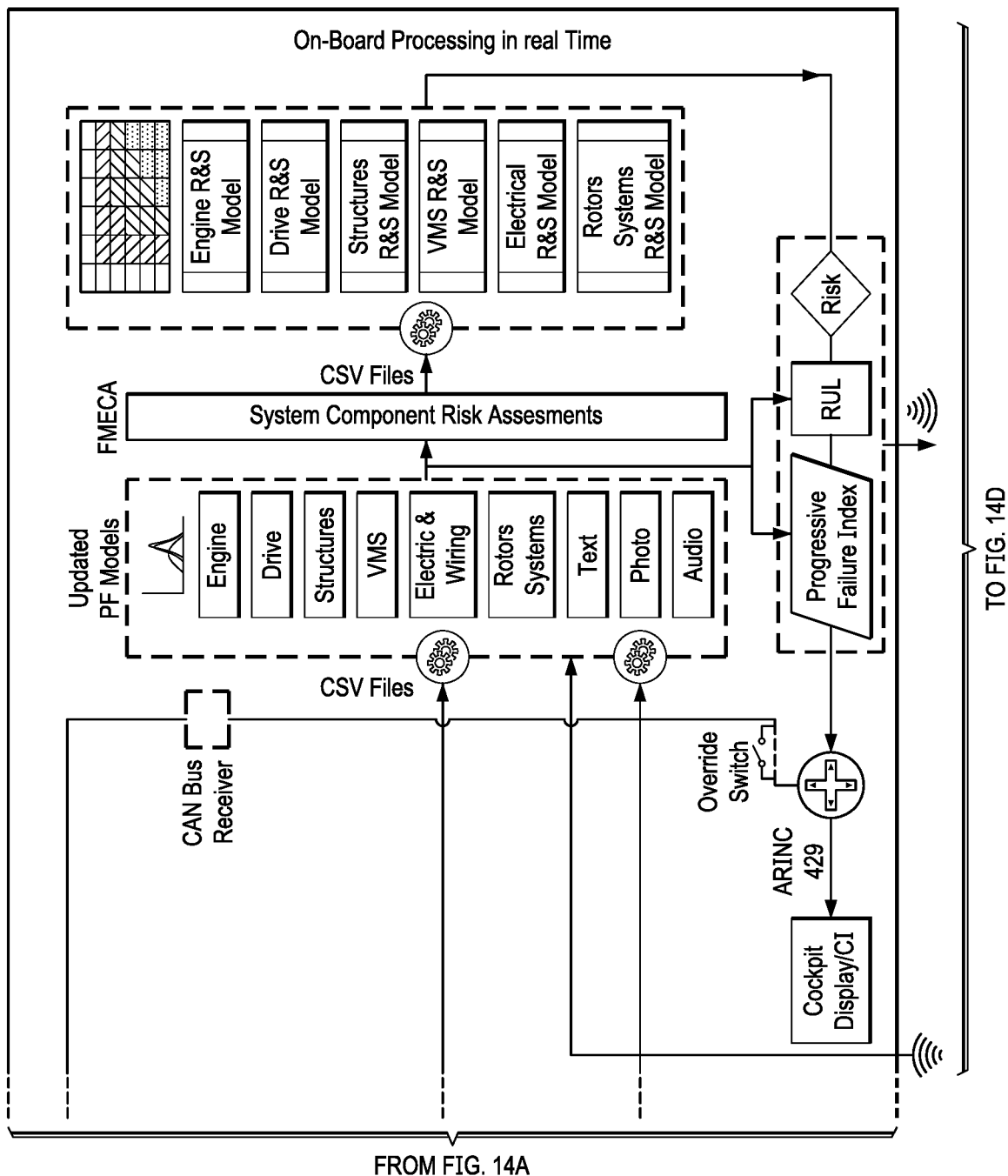
Figure 14C:
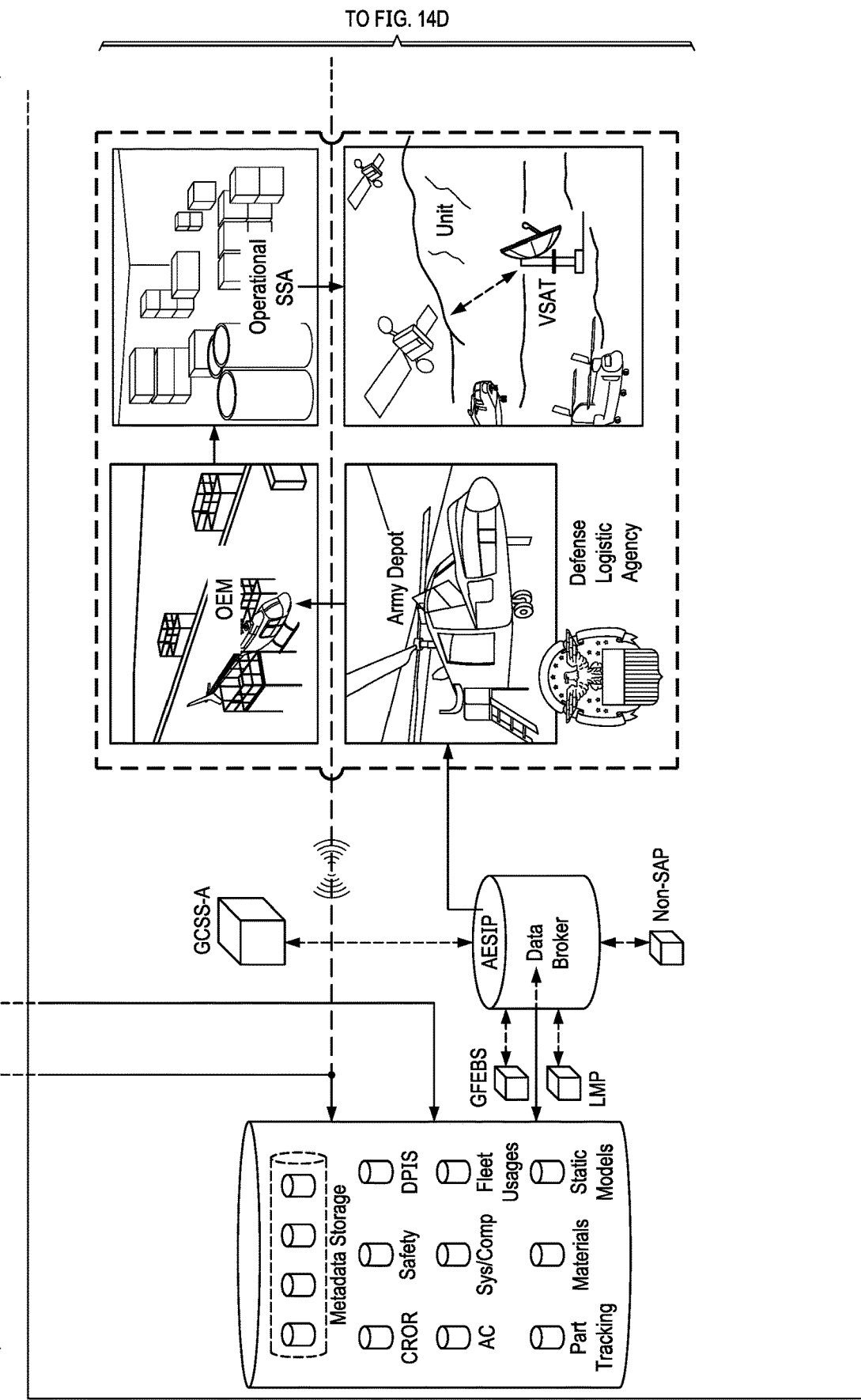
Figure 14D:
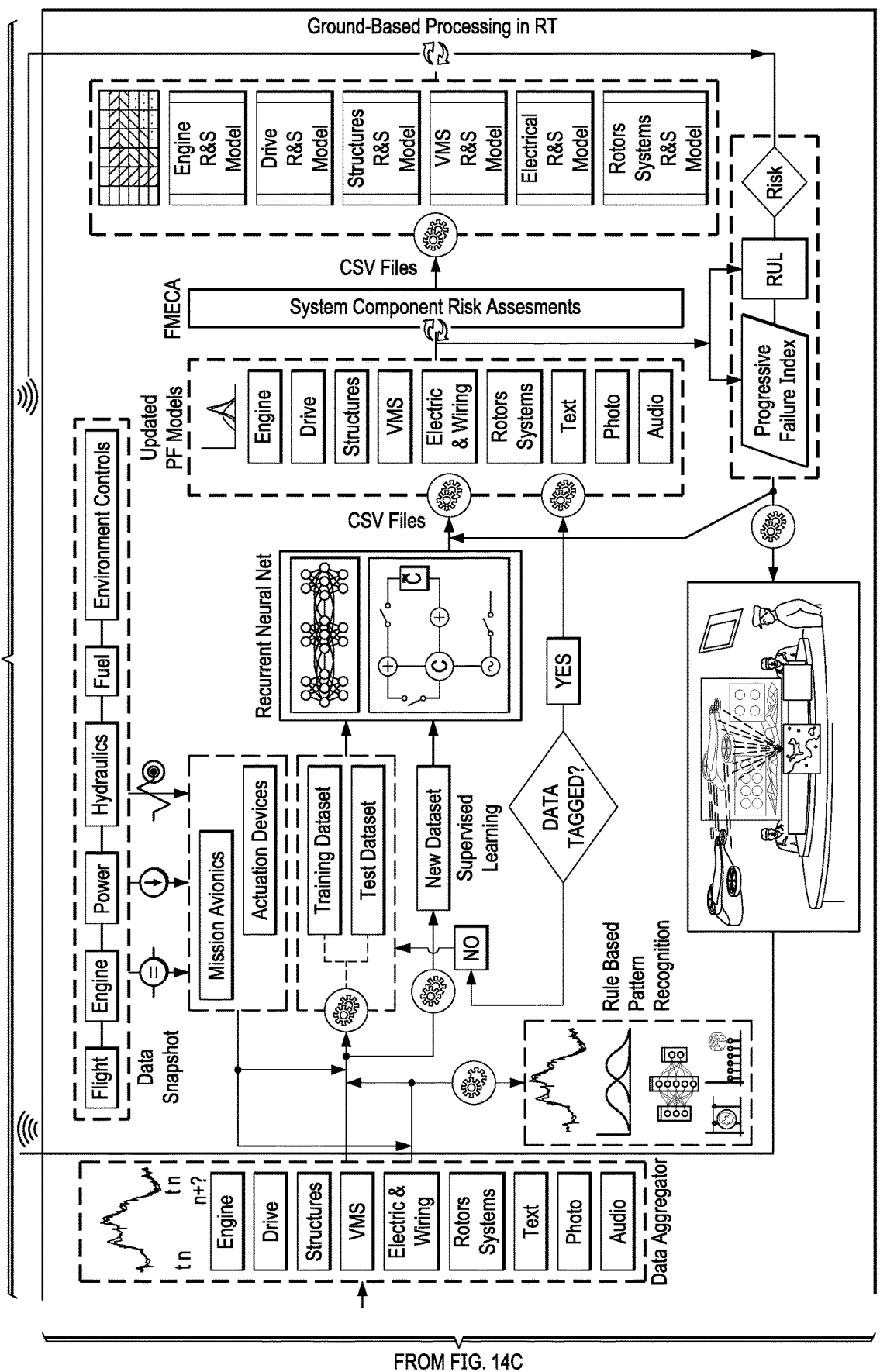

Now referring to FIG. 13, a block diagram 1300 of some uses of various embodiments of the present invention is shown. For example, the technology can be self-sustaining (e.g., fatigue-free structures, maintenance-free operating period, self-maintenance and optimization of large data, expeditionary missions with smaller logistic footprint, etc.), self-maneuvering (reconfigurable controls technologies, self-autorotation, autonomous systems teaming, fully autonomous missions, etc.), and/or self-adapting and survivability (e.g., self-healing, self-informed of parts replacement demands and schedules, self-informed of remaining capability to achieve demanding tasks or maneuvers, etc.).

Now referring to FIGS. 14A-D, a block diagram of a system 1400 for automatically predicting and detecting a failure of a system or a component in accordance with one embodiment of the present invention is shown. The system can detect system failures in advance and prolong system design life. A first processing system is installed on board the system to be monitored, such as a vehicle or facility. The vehicle can be: (a) manned or unmanned; (b) military, commercial, governmental or personal; (c) aerial, marine, land or space; or (d) other type, either known or unknown. The facility can be any type that uses machines or equipment that can be monitored and are subject to potential failure. The system can also be an infrastructure, a group of vehicles or facilities, and any combination thereof. A second processing system is installed at a control center, which can be at a fixed location, multiple locations, mobile or a combination thereof. The first processing system is communicably coupled to the second processing system via one or more communication links. The first processing system can be operated in a stand-alone mode or a coordinated mode with other processing systems, including but not limited to the second processing system.

The first processing system includes a data aggregator communicably coupled to a plurality of data sources, such a sensory systems and network, monitoring systems, digital data busses, other on-board systems (e.g., adaptive vehicle management system (AVMS), etc.), flight crew sentiment and audio communications, platform noise/signatures, environmental information, platform/mission equipment packages, electronic pilot logbook, etc. Data from the plurality of data sources can be collected by data collection devices (analog/discrete), programmable logic controller bus data (ARINC, 1553, RS 232, Wi-Fi, Ethernet, etc.) or other interfaces. The data aggregator collects and formats data from the data sources for use by the first processing system. The data can include engine data, drive system data, structural data, VMS, electric and wiring data, rotor systems, text, photos, audio, etc. The data aggregator provides properly formatted data to various processing modules, such as a rule-based pattern recognition module, supervised learning module, etc.

Mission avionics and actuation devices are communicably coupled to various control systems, such as flight control systems, engine systems, power systems, hydraulic systems, fuel systems, environmental controls, etc. The mission avionics and actuation devices provide data to the supervised learning module and the rule-based pattern recognition module. The supervised learning module includes a training dataset, a test dataset and a new or current dataset. A recurrent neural network accesses the datasets. The rule-based pattern recognition module also provides data to the training dataset and test dataset if the data is not tagged. If the data is tagged, it is provided to a set of updated predictive failure models that correspond to the systems monitored by the data aggregator. Data from the recurrent neural network is also provided to the set of updated predictive failure models.

The updated predictive failure models provide data to the system/component risk assessment module and integrated adaptive controls. The system/component risk assessment module provides data to the updated risk and survivability models, which may include an engine system risk and survivability model, drive system risk and survivability model, structural risk and survivability model, VMS risk and survivability model, electrical risk and survivability model, rotor system risk and survivability model, etc. The system determine a risk for any component or the system based on the updated risk and survivability models, which is then evaluated based on a set of rules and data from the updated predictive failure models. A progressive failure index is then determined based on this data. The progressive failure index data is provided to an information transfer system (e.g., ARINC 429), which provides the data to the cockpit display/CIs and a CAN bus receiver communicably coupled to various control systems (e.g., flight control systems, engine systems, power systems, hydraulic systems, fuel systems, environmental controls, etc.). An override switch is typically installed between the information transfer system and the CAN bus receiver.

The second processing system includes a local version of the first processing system that can be used for mission planning, system analysis, diagnostics, troubleshooting, system override, etc. Preferably, the first processing system and the second processing system synchronize data in real time. The second processing system may include or be communicably coupled to various databases (e.g., metadata storage, CROR, Safety, DPIS, AC, Sys/Comp, Fleet usages, part tracking, materials, static models, etc.) and other systems (GCSS-A, AESIP, GFEBS, LMP, Non-SAP, logistic agencies (e.g., army depot, OEM, operational SSA, VSAT, etc.).

As illustrated and described above, another embodiment of the present invention provides an awareness and capability system for a vehicle comprising one or more data sources; one or more data collection devices communicably coupled to the one or more data sources; a data aggregator communicably coupled to the one or more collection devices; one or more processors comprising a rule-based pattern recognition module communicably coupled to the data aggregator, a recurrent neural network communicably coupled to the data aggregator, one or more predictive failure models communicably coupled to the recurrent neural network, a risk assessment module communicably coupled to the predictive failure modules, one or more risk and survivability models communicably coupled to the risk assessment module, a rule-based risk and failure module communicably coupled to the one or more predictive failure models and the one or more risk and survivability models, and wherein the rule-based risk and failure module provides a vehicle state awareness and capability information; and an output device communicably coupled to the one or more processors via the rule-based risk and failure module, wherein the output device provides the vehicle state awareness and capability information. In one aspect, a supervised learning module is communicably coupled between the data aggregator and the recurrent neural network. In another aspect, the rule-based pattern recognition module is communicably coupled to the supervised learning module and the one or more predictive failure models. In another aspect, the one or more processors operate and provide data to the display in real time. In another aspect, a ground-based system mirrors and communicates with the awareness and capability system. In another aspect, the ground-based system is synchronized with the awareness and capability system in real time. In another aspect, one or more databases are communicably coupled to the ground-based system that mirrors and/or the awareness and capability system. In another aspect, one or more mission avionics and/or actuation devices communicably coupled to the one or more processors. In another aspect, the output device comprises a display, a heads-up-display, and/or an audio system. In another aspect, the vehicle state awareness and capability information comprises one or more risk levels and/or one or more capability and survivability metrics. In another aspect, the vehicle comprises an aircraft, a land craft, a watercraft, a spacecraft or a hybrid craft. In another aspect, the vehicle comprises a manned vehicle or an unmanned vehicle.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims. All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

All of the systems, devices, computer programs, compositions and/or methods disclosed and claimed herein can be made and executed without undue experimentation in light of the present disclosure. While the systems, devices, computer programs, compositions and methods of this invention have been described in terms of preferred embodiments, it will be apparent to those of skill in the art that variations may be applied to the systems, devices, computer programs, compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A system for automatically predicting and detecting a failure of a plurality of systems or components of a vehicle comprising:
   a plurality of data sources;
   a data pipeline interface communicably coupled to the plurality of data sources that processes and stores data from the plurality of data sources in one or more relational databases;
   one or more processors communicably coupled to the data pipeline interface and the one or more relational databases, wherein the one or more processors quantify, forecast and prognosticate a likelihood of future events affecting the plurality of systems or components during operation of the vehicle using a plurality of predictive models, wherein each predictive model corresponds to one of the systems or components of the vehicle comprising a risk and probability of outcomes and multi-scale modeling, and determine one or more options and impacts to reduce a probability of the failure and prolong a life of at least one of the plurality of systems or components during operation of the vehicle based on the likelihood of future events using a prescriptive module comprising deep learning networks, training and reduced uncertainty analysis; and
   one or more devices coupled to the one or more processors that provide the one or more options and impacts or implement the one or more options.

2. The system as recited in claim 1, wherein the predictive models further comprise one or more of regression analysis, regression models, signal detection and data fusion theory, remaining useful life analysis, statistical analysis, pattern recognition, neurocomputing, data mining, knowledge discovery in databases.

3. A method for automatically predicting and detecting a failure of a plurality of systems or components of a vehicle comprising:
   providing a plurality of data sources, a data pipeline interface communicably coupled to the plurality of data sources, one or more processors communicably coupled to the data pipeline interface and the one or more relational databases, and one or more devices coupled to the one or more processors;
   processing and storing data from the plurality of data sources in one or more relational databases using the data pipeline interface;
   quantifying, forecasting and prognosticating a likelihood of future events affecting the plurality of systems or components during operation of the vehicle using a plurality of predictive models, wherein each predictive model corresponds to one of the systems or components of the vehicle comprising a risk and probability of outcomes and multi-scale modeling executed by the one or more processors;
   determining one or more options and impacts to prolong a life of at least one of the plurality of systems or components during operation of the vehicle based on the likelihood of future events using a prescriptive module executed by the one or more processors, wherein the prescriptive model comprising deep learning networks, training and reduced uncertainty analysis; and
   providing the one or more options and impacts or implementing the one or more options using one or more devices.

4. The method as recited in claim 3, wherein the predictive models further comprise one or more of regression analysis, regression models, signal detection and data fusion theory, remaining useful life analysis, statistical analysis, pattern recognition, neurocomputing, data mining, knowledge discovery in databases.

5. An awareness and capability system for a vehicle comprising:
   one or more data sources;
   one or more data collection devices disposed within the vehicle and communicably coupled to the one or more data sources;
   a data aggregator disposed within the vehicle and communicably coupled to the one or more collection devices;
   mission avionics and actuation devices disposed within the vehicle;
   one or more processors disposed within the vehicle and comprising a rule-based pattern recognition module disposed within the vehicle and communicably coupled to the data aggregator and the mission avionics and actuation devices, a supervised learning module disposed within the vehicle and communicably coupled to the data aggregator, the mission avionics and actuation devices, and the rule-based pattern recognition module, a recurrent neural network communicably coupled to the supervised learning module, a plurality of predictive failure models wherein each predictive failure model corresponds to a component or system of the vehicle and comprises a risk and probability of outcomes and multi-scale modeling communicably coupled to the recurrent neural network and the rule-based pattern recognition modules, a risk assessment module communicably coupled to the plurality of predictive failure models, a plurality of risk and survivability models communicably coupled to the risk assessment module, wherein each risk and survivability model corresponds to the component or system of the vehicle, a rule-based risk and failure module communicably coupled to the plurality of predictive failure models and the plurality of risk and survivability models, and wherein the rule-based risk and failure module provides a vehicle current state awareness and capability information during operation of the vehicle comprising a current risk level for one or more systems of the vehicle during operation of the vehicle, and a capability and survivability metric for one or more operational capabilities of the vehicle during operation of the vehicle; and an output device disposed within the vehicle and communicably coupled to the one or more processors via the rule-based risk and failure module, wherein the output device provides the vehicle current state awareness and capability information during operation of the vehicle comprising the current risk level for the one or more systems of the vehicle during operation of the vehicle, and the capability and survivability metric for the one or more operational capabilities of the vehicle during operation of the vehicle.

6. The system as recited in claim 5, wherein the one or more processors operate and provide data to the display in real time.

7. The system as recited in claim 5, further comprising a ground-based system that mirrors and communicates with the awareness and capability system.

8. The system as recited in claim 7, wherein in the ground-based system is synchronized with the awareness and capability system in real time.

9. The system as recited in claim 7, further comprising one or more databases communicably coupled to the ground-based system that mirrors and/or the awareness and capability system.

10. The system as recited in claim 5, further comprising one or more mission avionics and/or actuation devices communicably coupled to the one or more processors.

11. The system as recited in claim 5, wherein the output device comprises a display, a heads-up-display, and/or an audio system.

12. The system as recited in claim 5, wherein the vehicle comprises an aircraft, a land craft, a watercraft, a spacecraft or a hybrid craft.

13. The system as recited in claim 5, wherein the vehicle comprises a manned vehicle or an unmanned vehicle.

\* \* \* \* \*